Sept. 23, 1952  H. J. SHAFER  2,611,321
VESSEL AND FLUID PROPELLING DEVICE
Filed Aug. 29, 1946  3 Sheets-Sheet 2

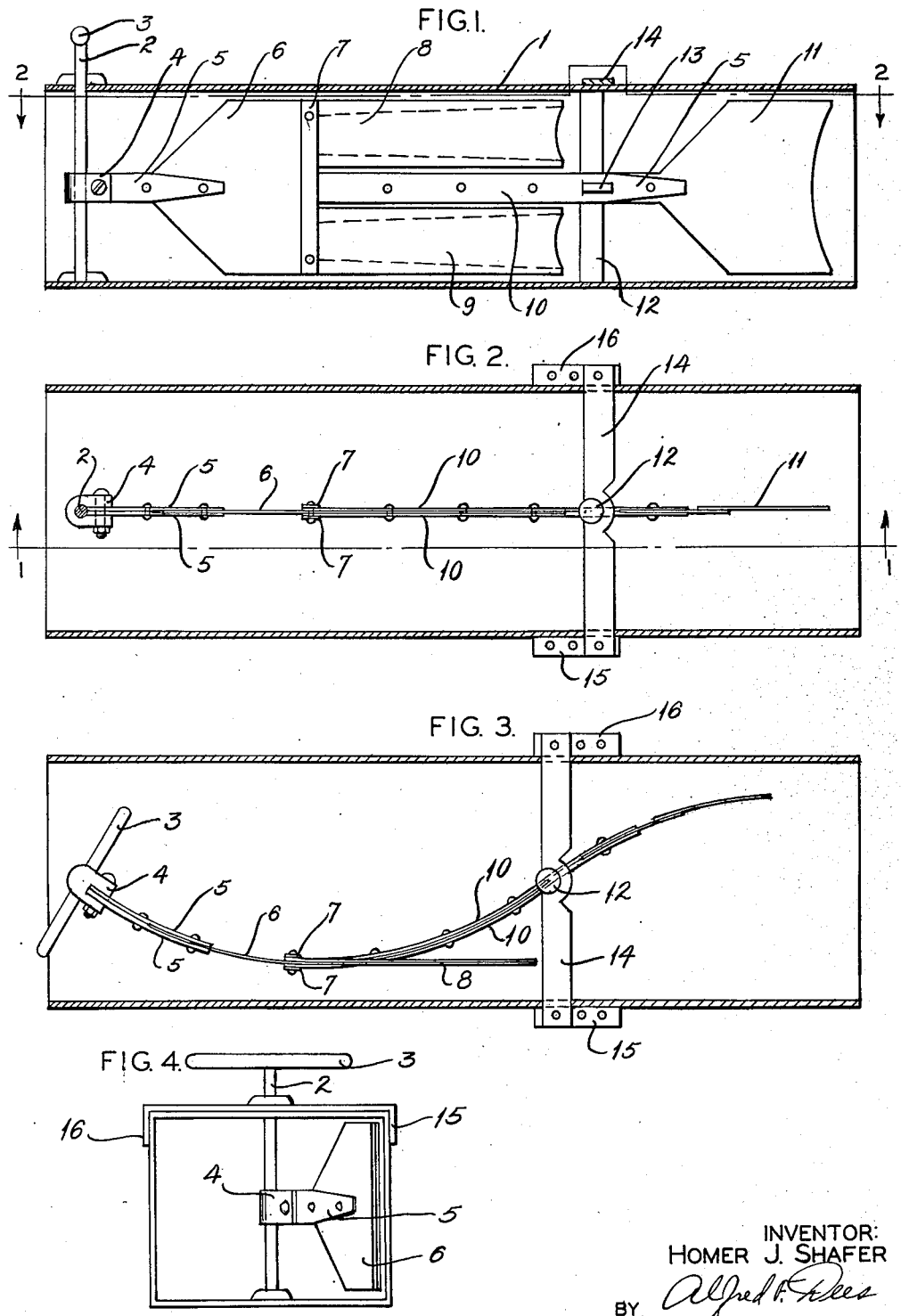

INVENTOR:
HOMER J. SHAFER
BY
ATTORNEY.

Sept. 23, 1952      H. J. SHAFER      2,611,321
VESSEL AND FLUID PROPELLING DEVICE
Filed Aug. 29, 1946      3 Sheets-Sheet 3
FIG. 10.
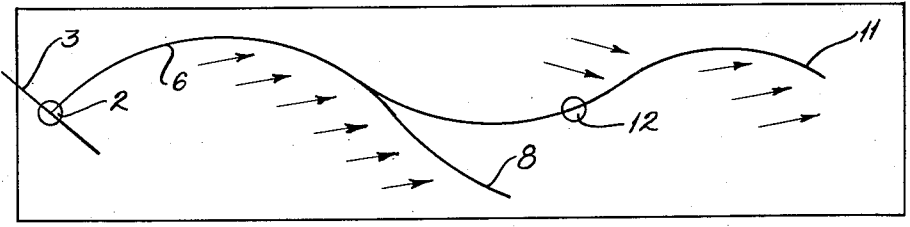
FIG. 11.
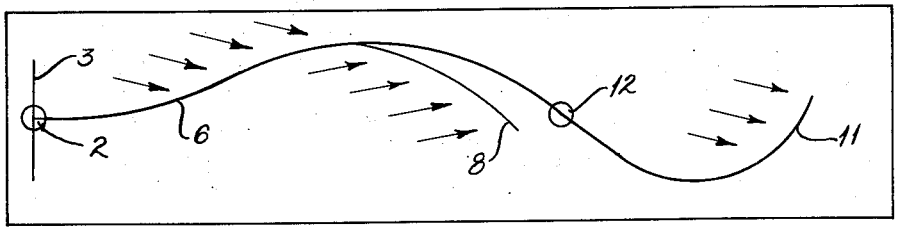
FIG. 12.
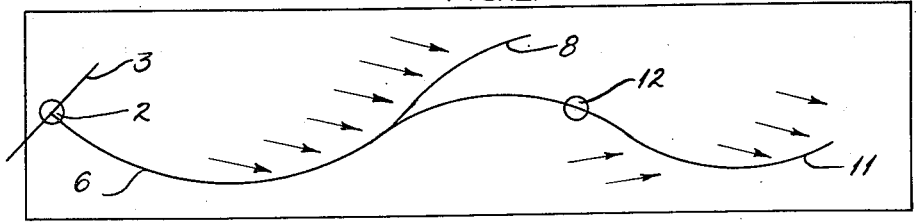
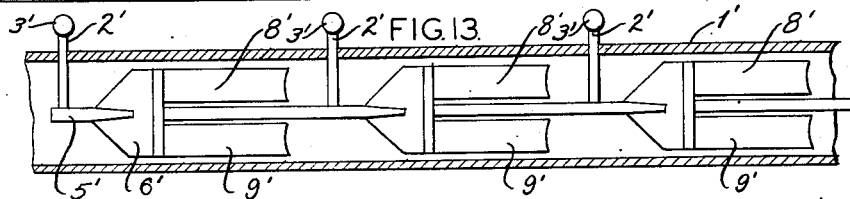
FIG. 14.
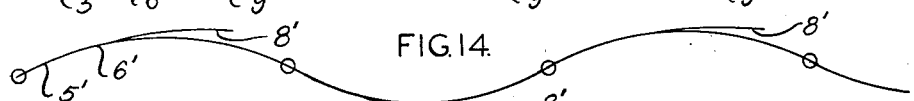
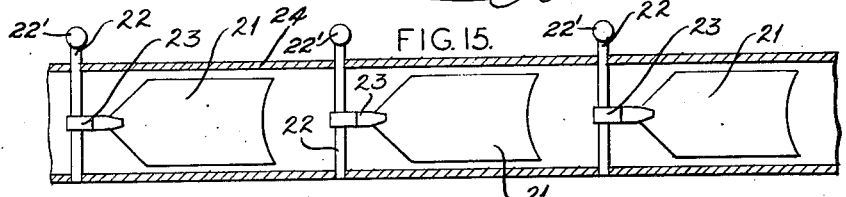
FIG. 16.
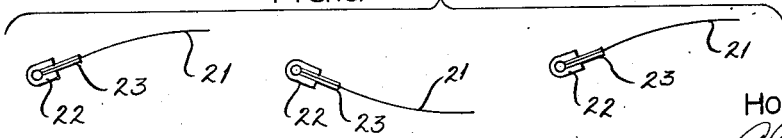
INVENTOR:
HOMER J. SHAFER
BY Alfred F. Giles
ATTORNEY Patented Sept. 23, 1952

2,611,321

UNITED STATES PATENT OFFICE 2,611,321

VESSEL AND FLUID PROPELLING DEVICE

Homer J. Shafer, Mansfield, Ohio

Application August 29, 1946, Serial No. 693,672

14 Claims. (Cl. 103—80)

This invention relates to fluid impelling means and in its more specific aspects is directed to a mechanism and method of operation that simulates the body motion of an amphibious mammal or aquatic vetrebrate in their movement through and in water or other fluid.

The object of this invention is to relatively move a body and an open ended tubular member having impelling means therein whose action simulates the body motion of an amphibious mammal or aquatic vertebrate.

A further object of the invention is to provide flexible impelling means for the purpose of relatively moving an open ended tubular member and the fluid therein or the fluid around and in which the impelling mechanism or means is placed.

A still further object of the invention is to provide an oscillatable impeller whose motion is sinous in character and which is placed in an open ended tubular member and that imposes a sinuous motion on the fluid in said member to relatively move the impeller and the fluid in the member.

Other and further objects of the invention will occur to those skilled in the arts to which this invention pertains as the description proceeds which taken in connection with the accompanying drawings sets forth a preferred embodiment thereof as well as selected modifications but such disclosures are not to be construed as a limitation of the invention which is limited only by the appended claims and any and all modifications, alterations and variations of structure coming within the spirit and scope thereof are deemed to be included herein.

The propulsion of liquids through conduit or the propulsion of a vessel through or over a liquid has in the past been accomplished by means of a variety of pumps or by propellers all of which have proved to be rather inefficient because of inherent structural limitations and deficiencies. The desire and aim of inventors of the prior art was to conform those devices to known laws of nature. Experience has proved that the prior art embodiments were not built in conformity to natural laws of motion. The instant invention seeks to propel a fluid through a conduit or drive a vessel through or over liquids in closer conformity to natural laws whose characteristic is present in and by means of which certain amphibious and aquatic forms of vertebrate life propel themselves through liquids and which are known to do so at maximum efficiency. It has been discovered that by means of the mechanism to be subsequently described that liquids can be propelled or conducted through conduit and vessels through and over liquids at a far less expenditure of energy than by prior art devices.

In the drawings:

Fig. 1 shows a sectional elevational view of the improved propelling mechanism taken substantially along the line 1—1 of Fig. 2.

Fig. 2 shows a view taken substantially along the line 2—2 of Fig. 1.

Fig. 3 shows a device similar to Fig. 2 but with the device in operative condition.

Fig. 4 shows an end elevational of the propelling device.

Figs. 9–12 show the course of fluid flow under normal load conditions for various operative positions of the mechanism during one complete operating cycle.

Figure 5:
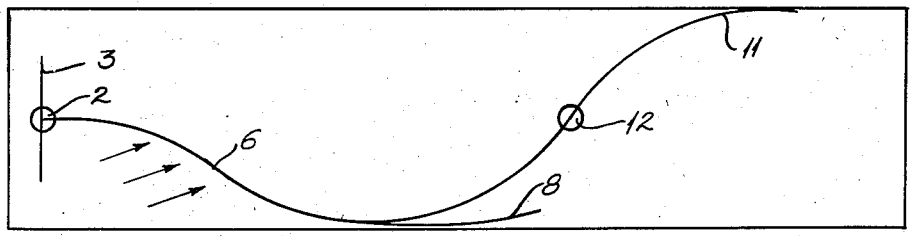
Figs. 5–8 show the position of the impelling device and applicable forces in the various operative positions of the mechanism during one complete operating cycle.

Figs. 13 and 14 schematically show a modified propelling device and their operative positions with respect to each other.

Figs. 15 and 16 schematically show another modified form of the propelling device and their operative positions with respect to each other.

The objects and advantages outlined above are obtained in the structure set forth in the several views of the drawings and in which 1 designates a tubular housing considerably greater in length than its depth or width. A shaft 2 is rotatably mounted in the housing 1 at one end thereof, said shaft being arranged in two bearings mounted on opposite sides of the housing. A handle 3 secured to the shaft 2 enables the operator to oscillate same or some suitable prime mover may be employed to oscillate the shaft. The shaft 2 is preferably oscillated through an angle of less than 180° but more than 0°.

A substantially U-shaped clamp member 4 is mounted on the shaft 2 between whose open ends or jaws members 5, 5 are arranged. A suitable bolt is arranged in the clamp to lock in position the members 5, 5 received therein. The forward end portion of the impeller member 6 is disposed between the members 5, 5 and also extends between the jaws of the clamp member 4. The impelling member 6 has a height substantially equal to the depth of the housing 1 and is formed of a comparatively thin section sheet material having spring qualities. The impelling member extends rearwardly and is provided with reinforcing members 7, 7 and beyond the reinforcing members the impeller is divided into two fin portions 8 and 9 that extend rearwardly a considerable distance. The impelling member 6 has a narrow portion that extends rearwardly between the two fins 8 and 9 reinforced by members 10, 10. The extreme end of the member 6 is flared to form a tail piece 11 which is dimensioned and proportioned as shown. While the section of the impelling member is comparatively thin the nose or forward portion has a thicker section than the fins or tail piece, it being preferred that the combined portions, nose, fins and tail, present a wedge shaped section of material to increase the whipping action of the fins and tail piece to thereby provide increased impelling action on the fluid in which the device is operating.

The narrowed portion of the member 6 and the reinforcement members 10, 10 are supported in a spindle 12 which is suitably slotted to receive member 6 and associated structure. The narrowed portion of member 6 and the slotted portion of the spindle 12 are provided with an aperture in which pin 13 is inserted thereby fastening the said portion to the spindle 12. The spindle 12 is received in a bearing member 14 associated with the housing 1 and which is directly connected to brackets 15 and 16 mounted on the housing 1 either exteriorly or interiorly thereof as desired. The brackets are provided with a plurality of apertures to enable the bearing member 14 to be moved from one position to the other to thereby bow the impelling member 6 so that it will assume a position e. g. shown in Fig. 3. The closer bearing member 14 is brought to shaft 2 the more pronounced the bowing of the impeller and the greater the impelling force when operated. Suitable slots may be formed in the upper wall of the housing 1 to allow spindle 12 to move relative to housing 1. If desired the spindle 12 may remain stationary and the shaft 2 may be moved longitudinally with respect to the housing 1.

Figure 6:
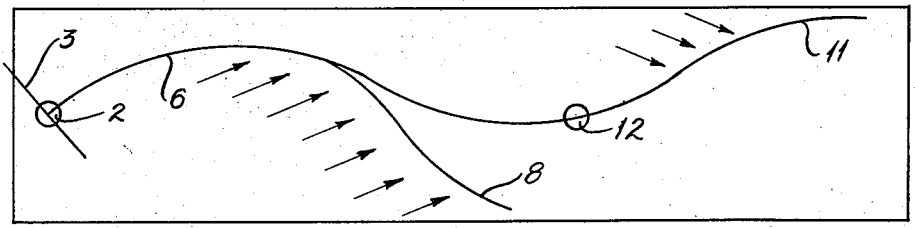
Figure 7:
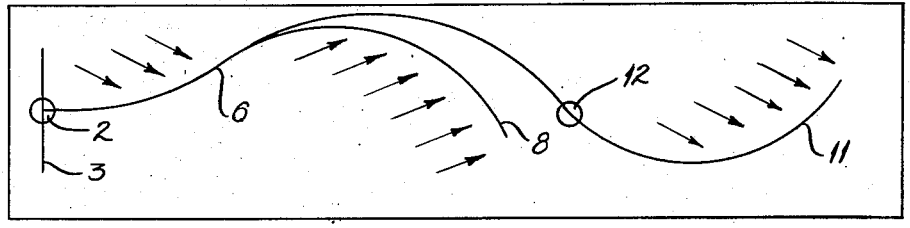
Figure 8:
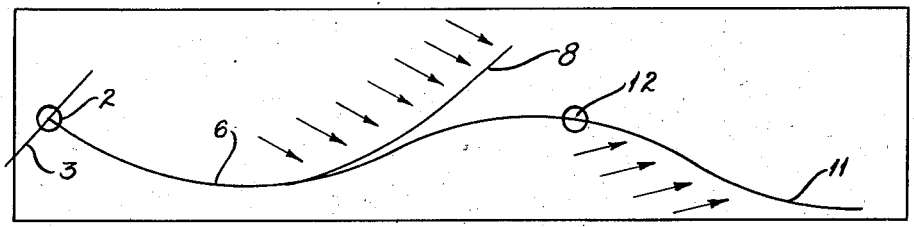

Figs. 5–8 show the sinuous movement of the impelling member 6 when oscillative movement is imposed on shaft 2 through a complete operating cycle. A negative pressure is developed behind fins 8 and 9 and the tail piece 11 during the first portion of the stroke at the same time that a positive pressure is developed on the immediate opposite sides thereof, this being caused by the lag in motion of the fins 8 and 9 and the tail piece 11 behind the nose portion of 6 and its central portion which is secured to the shaft 2 and the spindle 12. The forward portion is regarded as the side of the bowed impeller facing the spindle end of the impeller. The arrows indicate the actual progress of the applied force to the different portions of the impeller 6 during each successive stage of the impeller action as the shaft 2 is oscillated through the required number of degrees of motion. Long and wide curves are formed in the impeller unit during the first stages of operation and when fluid motion becomes rapid the curves are not so pronounced but the same positive and negative and positive pressures are still produced on opposite sides of the fins and tail piece. During the early stages of operation as the shaft 2 is oscillated through its maximum swing the fins and tail piece will tend to strike the sides of the housing when the parts are proportioned as shown but as the rate of oscillation of shaft 2 increases and speed of liquid increases the swings of fins and tail piece decrease and conform more closely to the motion of the nose portion and the central portion of the impeller 6. Fluid motion is accelerated and its speed is maintained respectively as a result of changing of the rate of shaft 2 oscillation or continued oscillation of the shaft 2 at a constant rate.

Figure 9:
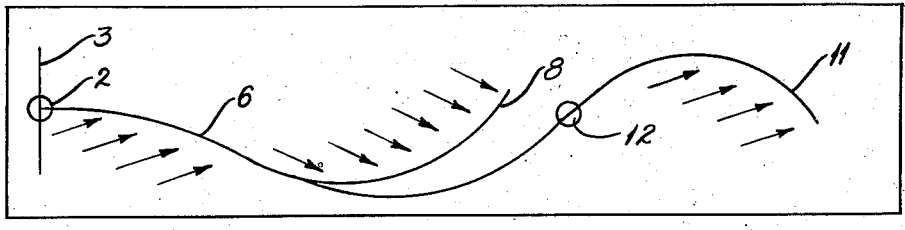

The arrows applied to the impeller unit in Figs. 9–12 illustrate the course of liquid flow relative to the housing 1 because of the load imposed to either propel a liquid through a conduit or a vessel through or over liquid. The several views show the motion of the liquid during the various operative positions of the impeller 6 during one complete cycle of operation.

The device may be installed in a conduit when propelling liquids and if employed to propel a vessel it may be secured to either the sides or bottom of a vessel or both and with or without the housing 1. It should therefore be apparent that a device has been produced that simulates the action of amphibious and aquatic vertebrates or similar forms of life and that higher efficiencies are produced by the mechanism illustrated because of the sinuous motion of the impelling unit and its operative portions.

Fig. 13 schematically illustrates an impelling device in which a plurality of impeller units 6' and provided with forward or nose portions and having fin portions 8' and 9' are secure to the members 5', whose structure has been described above. A plurality of shafts 2' are provided to which the impeller members 6' are connected in the manner illustrated. Each of the shafts 2' is separately driven and in a timed sequence or only selected ones need be driven and in a timed sequence. The time sequence is fully illustrated in Fig. 14 wherein the position of each unit with respect to the next succeeding unit is shown for the most efficient operation. The housing in which the several impellers 6' are mounted is designated by the numeral 1'. This device and its mode of operation is identical with that set forth above but omitting the action of the tail pieces and since the several units are arranged in series and connected together the total power output will be the sum of all of the units.

Fig. 15 shows a plurality of impelling members 21 secured to shafts 22 by means of clamps 23. Shafts 22 are oscillatably mounted in housing 23 and they are preferably oscillated in a timed sequence by suitable driving means. The preferred sequence of operation is illustrated in Fig. 16 which shows the position each unit with respect to a succeeding unit for operation at maximum efficiency. The members 21 may be made as shown in Fig. 13 but are preferably made of a single or one piece tapered section of spring sheet material for reasons set forth above. The section of the material tapers from a comparatively thick section at the nose to a thin section at the rear end or the free end of the unit. The action and operation of this modification is substantially identical with that described above but without the asistance of a tail piece and as in the Figs. 13 and 14 disclosure.

The two modified structures shown are placed in a conduit or tubular member when propelling liquids as set forth above in connection with the preferred embodiment in Figs. 1–12. The impelling members 6', 8', 9' of Figs. 13 and 14 and 21 of Figs. 15 and 16 are installed in the bottom wall of a vessel to be propelled and with or without the housings illustrated. Experience has proven the wisdom or employing the housing for the impelling members because much higher efficiencies result when so operated.

That which is regarded new, novel and useful and which is sought to be protected by Letters Patent of the United States is as follows:

I claim:

1. A fluid propelling device comprising a housing immersible in fluid; a shaft therein; a spindle therein; a bowed flexible impelling member connected between said shaft and said spindle; fins associated with said impelling member; and means to oscillate said shaft to impose a wave motion in said impelling member and said fins to thereby relatively move said housing and the fluid therein.

2. A propelling device comprising a housing immersed in fluid; a shaft therein; a spindle therein; a bowed flexible member having fins thereon movable relative to said flexible member, said flexible member connected between said shaft and said spindle; and means to oscillate said shaft to thereby set said flexible member in motion to relatively move fluid and housing, and to move said fins relative to said flexible member, the motion of said fins increasing the motion in the fluid initiated by said flexible member.

3. In a device as defined in claim 2 in which said flexible member includes a plurality of fins and a tail piece and in which the tail moves relative to said fins to further increase the fluid flow.

4. A propelling device comprising a housing; a shaft in said housing; a spindle in said housing; a flexible impelling member immersed in fluid in said housing and connected between said shaft and said spindle; fins associated with said impelling member; and means connected to said shaft to impose a sinuous motion in said flexible member and fins to thereby relatively move the fluid with respect to said flexible member and fins.

5. A fluid impelling unit comprising a body member; an oscillatable shaft mounted in said body member; a spindle; a flexible member submerged in the fluid and connected to said spindle and said shaft, said member formed from spring sheet material and having a nose piece thereon; fins secured to said flexible member; a tail piece connected to said flexible member, said flexible member tapering in section longitudinally thereof from nose to tail piece; and means to oscillate said shaft to generate a sinuous wave motion in said member, said tapered flexible member causing the fins and tail piece to have varying flexibility to thereby increase the rate of fluid flow relative to said member.

6. A fluid propelling device comprising a body a shaft mounted in said body; a spindle mounted in said body; a bowed flexible impelling member including fins movable relative thereto connected between said shaft and said spindle; and means to oscillate said shaft to thereby actuate said impelling member so that it may move the fluid in which it is immersed.

7. A fluid propelling device comprising a body a shaft mounted in said body; a spindle mounted in said body; an impelling member including fins movable relative thereto connected between said shaft and said spindle and immersible in the fluid to be propelled; and means connected to said shaft to impose a sinuous motion on said impelling member to thereby propel the fluid.

8. A fluid propelling device comprising a housing immersible in fluid; a shaft in said housing; a spindle in said housing; a bowed flexible impelling member connected between said shaft and said spindle and operable in a wave motion; fins on said member movable in an out of phase relation relative to the impelling member; a tail piece connected to said impelling member and movable in an out of phase relation to said impelling member; said movements causing fluid to move relative to said housing; and means connected to said shaft to actuate said bowed flexible member.

9. A device for imposing a wave motion in fluid comprising a body; an oscillatable shaft in said body; a spindle in said body; a flexible member submerged in fluid to be moved and connected between said shaft and said spindle the length of the flexible member between said shaft and spindle being greater than the distance between said shaft and spindle, said member when actuated moving in a wave motion; fin means associated with said member and moving in an out-of-phase relation to said member; tail piece connected to said member and movable in an out-of-phase relation to said member; and means connected to said shaft to actuate said bowed flexible member.

10. A propelling device comprising a substantially tubular housing; a plurality of spaced spindles oscillatably mounted in said housing; a flexible member connected to said spindles, the length of the member connected between each two of said spindles being greater than the spacing between said spindles; and means connected to at least one of said spindles to oscillate said spindles to thereby impose a wave like motion on said flexible member.

11. In a device as defined in claim 10 in which fins are associated with said member between each two spindles that move in an out-of-phase relation to said flexible member.

12. In a propelling device comprising a substantially tubular housing; a plurality of spaced spindles oscillatably mounted in said housing; flexible means associated with each of said spindles; fins secured to at least one of said spindles and operable in an out of phase relation with said flexible means; and means connected to at least one of said spindles to oscillate each of said spindles.

13. A device for imposing a sinuous wave-like motion on fluid comprising a body member; an oscillatable shaft mounted in said body; means secured to said shaft for oscillating same; a spindle mounted in said body; a bowed flexible member connected between said shaft and said spindle; and fin means swingably associated with said flexible member and movable with respect thereto and submerged in the fluid to be moved relative to said body.

14. A device for moving fluid comprising a body member a plurality of aligned and spaced apart spindles mounted in the body member; a flexible member connected between adjoining spindles, the spacing of the spindles being less than the length of flexible member connected therebetween; flexible fins secured to said flexible member and movable in an out-of-phase relation with said flexible member; and means connected to at least one of said spindles for oscillating said spindles.

HOMER J. SHAFER.

REFERENCES CITED

The following references are of record in the file of this patent:

UNITED STATES PATENTS

| Number | Name | Date |
|---|---|---|
| 621,719 | Shann | Mar. 21, 1899 |
| 842,278 | Wade | Jan. 29, 1907 |
| 966,491 | Turner | Aug. 9, 1910 |
| 1,109,155 | Turner | Sept. 1, 1914 |
| 2,407,901 | Petzold | Sept. 17, 1946 |
| 2,456,133 | Lipscomb | Dec. 14, 1948 |

FOREIGN PATENTS

| Number | Country | Date |
|---|---|---|
| 101,702 | Germany | Mar. 6, 1899 |
| 350,534 | Italy | July 15, 1937 |